United States Patent [19]
Itoh et al.

[11] Patent Number: 5,096,866
[45] Date of Patent: Mar. 17, 1992

[54] SUPPORTED PLATINUM ALLOY ELECTROCATALYST

[75] Inventors: Takashi Itoh, Ichikawa; Katsuaki Kato, Matsudo, both of Japan

[73] Assignee: N.E. Chemcat Corporation, Tokyo, Japan

[21] Appl. No.: 578,001

[22] Filed: Sep. 4, 1990

Related U.S. Application Data

[62] Division of Ser. No. 399,125, Aug. 28, 1989, Pat. No. 4,970,128.

[30] Foreign Application Priority Data

Aug. 26, 1988 [JP] Japan ................... 63-211621

[51] Int. Cl.$^5$ .................. H01M 4/88; B01J 23/89; B01J 21/18
[52] U.S. Cl. .................... 502/101; 502/184; 502/185
[58] Field of Search ............... 429/40, 42, 44; 502/185, 184, 101

[56] References Cited

U.S. PATENT DOCUMENTS

| | | | |
|---|---|---|---|
| 4,447,506 | 5/1984 | Luczak et al. | 429/44 |
| 4,613,582 | 9/1986 | Luczak et al. | 502/185 |
| 4,656,154 | 4/1987 | Drake | 502/185 |
| 4,716,087 | 12/1987 | Ito et al. | 429/44 |
| 4,794,054 | 12/1988 | Ito et al. | 429/44 |

FOREIGN PATENT DOCUMENTS 0129399 12/1984 European Pat. Off. ............ 502/101

Primary Examiner—Paul E. Konopka
Attorney, Agent, or Firm—Wenderoth, Lind & Ponack

[57] ABSTRACT

A supported platinum alloy electrocatalyst for an acid electrolyte fuel cell, said electrocatalyst consisting essentially of an electrically conductive powdery carbon carrier and dispersed in, and deposited on, the carrier, an ordered platinum-iron-copper ternary alloy comprising 40 to 60 atomic percent of platinum, 13 to 40 atomic percent of iron and 13 to 14 atomic percent of copper. The electrocatalyst has much better initial activity and lifetime than conventional platinum alone or multi-components alloy electrocatalysts. A process for producing the supported platinum alloy electrocatalyst which comprises depositing copper on a previously formed platinum-iron supported binary ordered alloy, again subjecting the product to an alloy treatment, or depositing iron on the platinum-copper supported binary alloy and then again subjecting the product to an alloying treatment. An electrode for an acid electrolyte fuel cell having an excellent output performance and a long operating life is also provided which comprises the above supported platinum alloy electrocatalyst and a water-repellent binder which are bonded to an electrically conductive and acid-resistant supporting member.

3 Claims, 2 Drawing Sheets $\beta_O$ PHASE : ORDERED FACE-CENTERED TETRAGONAL
$\gamma_D$ PHASE : DISORDERED CUBIC (Fe-rich)
$\gamma_D'$ PHASE : DISORDERED CUBIC (Cu-rich)
$\gamma_D''$ PHASE : DISORDERED CUBIC (Pt-rich)
T : TULAMEENITE $\beta_O$ PHASE : ORDERED FACE-CENTERED TETRAGONAL
$\gamma_D$ PHASE : DISORDERED CUBIC (Fe-rich)
$\gamma_D'$ PHASE : DISORDERED CUBIC (Cu-rich)
$\gamma_D''$ PHASE : DISORDERED CUBIC (Pt-rich)
T : TULAMEENITE

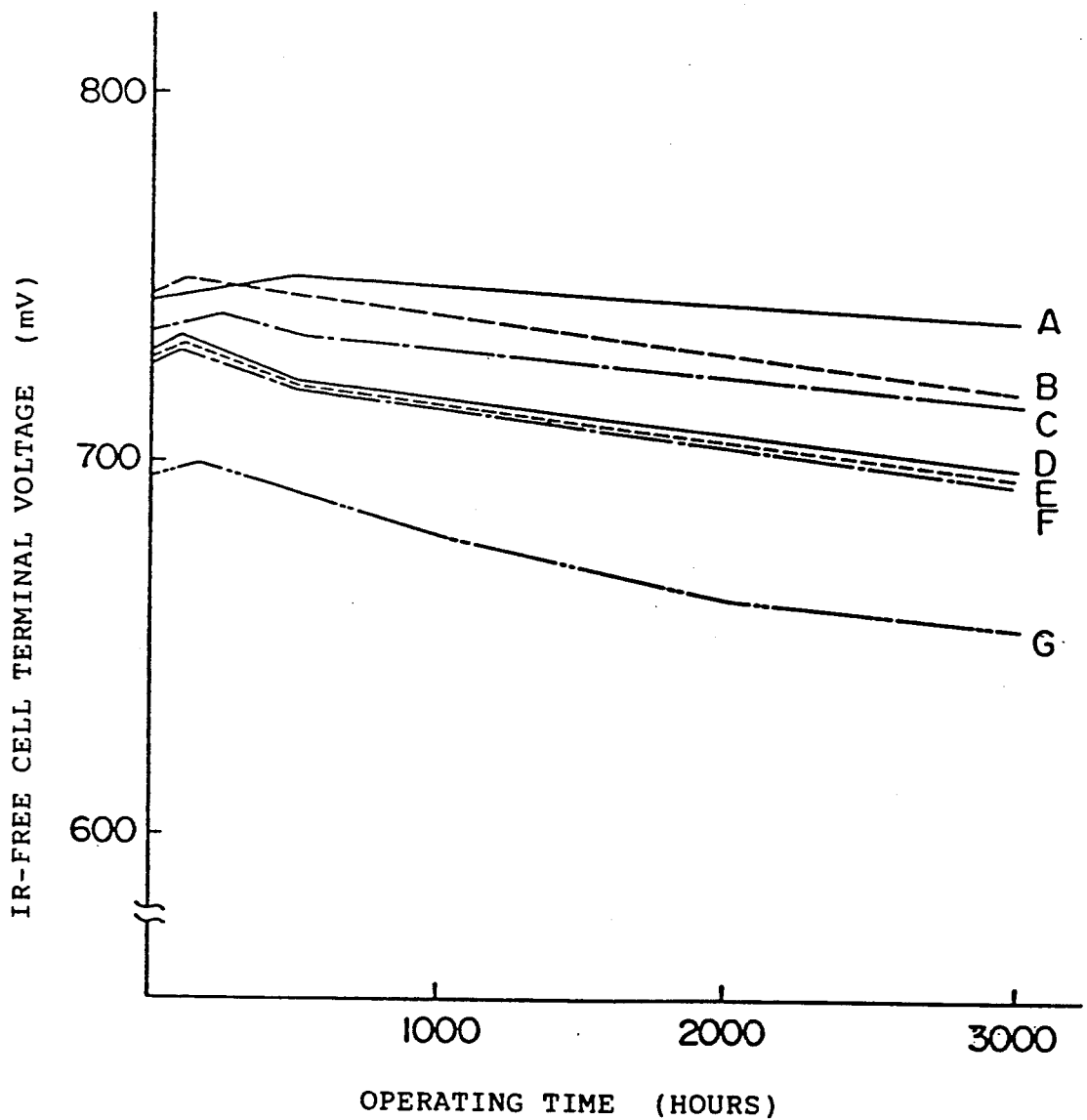

SUPPORTED PLATINUM ALLOY ELECTROCATALYST

This application is a divisional of Ser. No. 07/399,125, filed Aug. 28, 1989, now U.S. Pat. No. 4,970,128.

FIELD OF THE INVENTION

This invention relates to a supported platinum alloy electrocatalyst, processes for its production, and to an electrode containing the catalyst for use in an acid-electrolyte fuel cell.

PRIOR ART

The fuel cell is an electrochemical device for directly converting a chemical energy generated from an oxidation-reduction reaction of a fuel such as hydrogen or hydrocarbons and an oxidizer such as oxygen gas supplied thereto into a low-voltage direct current. It is generally comprised of a fuel electrode (anode), an oxidizer electrode (cathode), an electrolyte interposed between the electrodes, and means for separately supplying a stream of the fuel and a stream of the oxidizer to the anode and the cathode, respectively.

An electrocatalyst is used in the anode and the cathode, and in operation the fuel supplied to the anode is oxidized on the electrocatalyst in the presence of the electrolyte to release electrons. On the other hand, the oxidizing agent supplied to the cathode is reduced on the electrocatalyst in the presence of the electrolyte while consuming the electrons supplied from the anode via an external circuit. At this time, the current flowing through the external circuit is utilized as power under a fixed load.

Thus, the electrocatalyst plays an important role in the fuel cell, and the output and service life of the fuel cell depends greatly upon the activity of the electrocatalyst. In the early days, one or more noble metals selected from platinum (Pt), palladium (Pd), rhodium (Rh), ruthenium (Ru), iridium (Ir), osmium (Os), silver (Ag) and gold (Au) which are among the elements of Groups 8, 9, 10 and 11 of the periodic table (according to the IUPAC nomenclature recommended in Nov. 1983) were used in the form of metal black as the electrocatalyst.

Alloy catalysts comprising these noble metals in combination with one or more base metals such as aluminum, chromium, manganese, iron, cobalt, nickel and copper (U. S. Pat. Nos. 3,428,490 and 3,468,717), and skeleton catalysts resulting from dissolution of the base metal component from these alloys by acid or alkali treatment (U.S. Pat. No. 3,429,750) have also been used.

However, because these catalysts have a low metal surface area, they require great quantities of noble metals. Furthermore, since they are very susceptible to sintering in the electrolyte, they have a short active lifetime and are not economical.

Later, a catalyst composed of a noble metal component dispersed and supported on a powdery carrier such as electrically conductive carbon black came into use. This greatly reduced the amount of the noble metal used and increased the economic advantage of fuel cell power generation. However, for a phosphoric acid fuel cell which is now most likely to become practical to gain widespread commercial acceptance as a power generation system, it requires an operation life of at least 40,000 hours at an output efficiency above a reasonable level. An oxygen/hydrogen type phosphoric acid fuel cell has the defect that the activation polarization of an oxygen reduction reaction at the cathode is by far greater than that of a hydrogen oxidation reaction at the anode, and moreover, in the presence of the electrolyte at high temperatures and molecular oxygen as an oxidizer, dissolving and sintering of the active metal readily proceed.

In recent years, in order to develop a fuel cell having a high efficiency, a long life and a low price, investigations have been made on a carbon powder supported catalyst which is highly active mainly for the oxygen reduction reaction at the cathode. First, supported binary alloy catalysts composed of a platinum-group metal (one of noble metals of groups 8, 9 and 10 of the periodic table) and a base metal of groups 2 to 6 of the periodic table such as vanadium, aluminum, titanium and chromium, which have a mass activity for oxygen reduction about twice that of a catalyst composed of platinum alone, were found (U.S. Pat. Nos. 4,186,110, 4,202,934 and 4,316,944). Thereafter, for higher activity, a supported platinum ternary alloy catalyst composed of platinum-vanadium or platinum-chromium and cobalt (U.S. Pat. No. 4,447,506) and a supported ternary alloy catalyst composed of platinum, cobalt and nickel (Japanese Laid Open Patent Publication No. 8851/1986) were disclosed. On the other hand, a supported platinum-iron binary ordered alloy ($Pt_3Fe$ superlattice alloy) catalyst (Japanese Laid-Open Patent Publication No. 7941/1985), and further a supported ternary ordered alloy catalyst comprising platinum, chromium and cobalt (U.S. Pat. No. 4,711,829) were proposed.

Very recently, a platinum-iron-cobalt ternary alloy catalyst having not only improved catalytic activity but also an enhanced retention rate of metal surface area (Japanese Laid-Open Patent Publication No. 163746/1987) and a supported platinum-copper binary alloy catalyst excelling conventional ordered and non-ordered multi-component alloy catalysts in respect of the retention rate of metal surface area (Japanese Laid-Open Patent Publication No. 269751/1987) were disclosed.

However, none of these prior art catalysts can simultaneously satisfy activity and life required of practical fuel cells.

SUMMARY OF THE INVENTION

It is an object of this invention to provide an electrocatalyst having higher activity and a longer active lifetime than in the prior art.

The above object is achieved in accordance with this invention by a supported platinum alloy electrocatalyst for an acid electrolyte fuel cell, said electrocatalyst consisting essentially of an electrically conductive powdery carbon carrier and dispersed in, and deposited on, the carrier, an ordered platinum-iron-copper ternary alloy comprising 40 to 60 atomic percent of platinum, 13 to 40 atomic percent of iron and 13 to 40 atomic percent of copper.

The above object is also achieved in accordance with this by a process for producing a supported platinum alloy electrocatalyst for an acid electrolyte fuel cell, said electrocatalyst consisting essentially of an electrically conductive carbon powder carrier and dispersed in, and deposited on, the carrier, an ordered platinum-iron-copper ternary alloy comprising 40 to 60 atomic percent of platinum, 13 to 40 atomic percent of iron and 13 to 40 atomic percent of copper, which comprises depositing copper on a previously prepared platinum-iron supported ordered binary alloy, and further subjecting the product to a re-alloying treatment, or depositing iron on a previously prepared platinum-copper supported binary alloy and further subjecting the product to a re-alloying treatment.

Furthermore, the above object is achieved in accordance with this invention by an electrode for an acid electrolyte fuel cell, said electrode comprising a supported platinum alloy electrocatalyst, a water-repellent binder, and an electrically conductive and acid-resistant supporting member to which the electrocatalyst and the water-repellent binder are bonded, said electrocatalyst catalyst consisting essentially of an electrically conductive powdery caron carrier and dispersed in, and deposited on, the carrier, an ordered platinum-iron-copper ternary alloy comprising 40 to 60 atomic percent of platinum, 13 to 40 atomic percent of iron and 13 to 40 atomic percent of copper.

BRIEF DESCRIPTION OF THE DRAWINGS

FIG. 3 shows changes with time during 3000 hours in the IR-free terminal voltage of single cells comprising electrode including supported platinum-iron-copper ternary ordered alloy catalysts which are within the scope of the invention, or a conventional electrode including platinum alone a catalyst, or electrodes including multi-component platinum alloy catalysts are used as a cathode.

DETAILED DESCRIPTION OF THE PREFERRED EMBODIMENTS

Figure 1:
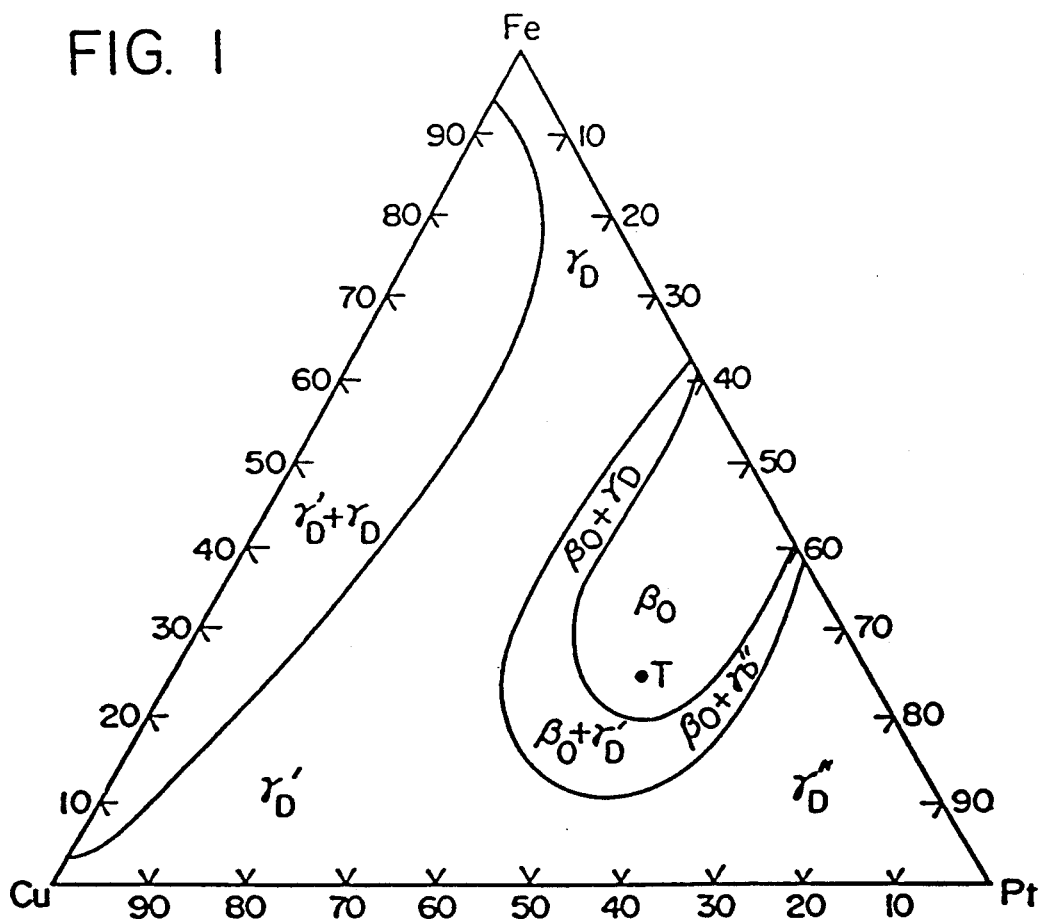
FIG. 1 is a phase diagram of a platinum-iron-copper ternary system at 1000° C.;, the numerals showing the composition of the metals in atomic percent.

In the present specification, the activity for the oxygen reduction reaction is evaluated by the maximum current density (mA/cm$^2$ of electrode area) which an oxygen half cell shows at $+900$ mV vs. a reversible hydrogen reference electrode (RHE; the same hereinafter). The current density per unit platinum mass is referred to herein as mass activity (mA/mg Pt). The quotient obtained by dividing the mass activity by a metal surface area (m$^2$/g Pt) is referred to herein as specific activity ($\mu$A/cm$^2$ Pt).

The metal surface area is expressed by an electrochemical metal surface area, EC.MSA (m$^2$/g Pt) obtained by measuring the amount of electricity in the course of hydrogen adsorption on a metal surface in the cathodic sweeps of cyclic voltammetry.

The supported platinum alloy electrocatalyst of this invention is formed from fine particles of a ternary ordered alloy comprising 40 to 60 atomic percent of platinum, 13 to 40 atomic percent of iron and 13 to 40 atomic percent of copper and an electrically conductive carbon powder carrier in and on which these fine alloy particles are dispersed and deposited.

In the present invention, the alloy denotes a substitutional solid solution alloy. In general, the substitutional solid solution formed of platinum and another element can be obtained in various crystal structures depending upon the type and proportion of the other element.

Platinum alone is face-centered cubic (f.c.c), and its X-ray diffraction (XRD) pattern has no diffraction peak at lower diffraction angles 2θ than that of the main diffraction peak (111).

Even with a platinum solid solution alloy, the Bravais lattice of a disordered alloy resulting from quite random substitution of other elements e lattice points of platinum remains face-centered cubic on an average, and does not show a diffraction peak at the lower dif-fraction angle 2θ side of (III) in its XRD pattern.

The XRD pattern of an ordered alloy of the $L_{12}$ type (Pt$_3$Fe type) in which the second metal component predominantly occupies (000) and platinum predominantly occupies (1/2, 1/2, 0) has a diffraction pattern of a primitive cubic lattice.

On the other hand, the XRD pattern of an ordered alloy of the $L_{10}$ type (PtFe type) in which platinum occupies (000) and ($\frac{1}{2}\frac{1}{2}$0) and the second component element occupies the remaining ($\frac{1}{2}$, 0, $\frac{1}{2}$) and (0, $\frac{1}{2}$, $\frac{1}{2}$) among the face-centered cubic lattice points of platinum has a diffraction pattern of a face-centered tetragonal system (f. c. t.).

In such ordered alloys, new diffraction peaks, i. e. ordered diffraction peaks, (100), and in the lower diffraction angle side of a main diffraction peak (111). The difference between the $L_{12}$ type and the $L_{10}$ type is confirmed by XRD pattern in which while in the former (220) and (202) are equivalent and become one diffraction line, they are non-equivalent and two diffraction lines appear in the latter.

Tulameenite Pt$_2$FeCu is known as a naturally occurring platinum-iron-copper solid solution alloy, and Cabri et al. reported that its crystal structure is of the $L_{10}$ type (f.c.t.) (L. J. Cabri et al., Canadian Mineralogist, Vol. 12, pp. 21–25, 1973)(a=b=3.891 Å, c=3.577 Å, c/a=0.9193)

Figure 2:
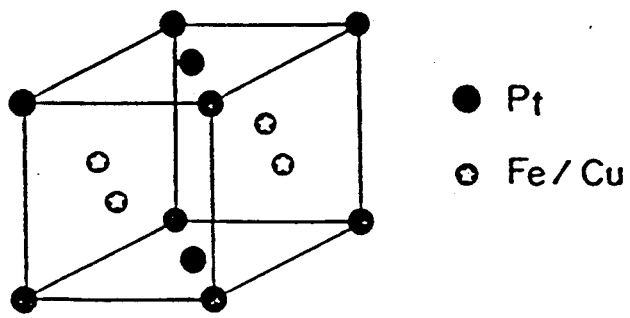
FIG. 2 shows the unit lattice structure of a platinum-iron-copper ternary face-centered tetragonal ordered alloy.

According to M. Shahmiri et al., an ordered face-centered tetragonal (f. c. t.) region ranging from tulameenite Pt$_2$FeCu to tetraferroplatinum PtFe exist in a phase diagram at 1000° C. of a platinum-iron-copper ternary system (M. Shahmiri et al., Mineralogical Magazine, Vol. 49, pp. 547–554, 1985; see FIG. 1 accompanying this application). In the Pt$_2$FeCu alloy of the tulameenite structure, platinum atoms occupy (000) and ($\frac{1}{2}$, $\frac{1}{2}$, 0) and iron or copper atoms occupy at random the remaining ($\frac{1}{2}$, 0, $\frac{1}{2}$) and (0, $\frac{1}{2}$, $\frac{1}{2}$) among the f. c. c. lattice points of platinum (see FIG. 2 of the accompanying drawings). Consequently, the axial length in the C axis direction is shortened, and the lattice parameter become a=b≠c, a>c. The lattice parameters of an tetragonal ordered alloy within a preferred composition range in the catalyst of this invention are in the range of a=3.910 –3.870 Å, c=3.580 –3.670 Å.

There is also a cubic alloy of the $L_{12}$ type (Pt$_6$FeCu type) as the ordered alloy of the catalyst of this invention. Its lattice parameter a changes depending upon the composition from the f. c. c. lattice parameter meter a=3.923 Å of platinum alone toward the lattice parameter (extrapolated to room temperature) of f. c. c. γ-Fe a=3 72 Å or the f. c. c. lattice parameter of copper a=3.615. A cubic ordered alloy of the catalyst within a desirable composition range of this invention has a lattice parameter a of about 3.790 to 3.860 Å.

If the proportion of at least one of iron and copper is less than 13 atomic percent in the platinum-iron-copper ternary alloy catalyst of the invention, or the proportion of platinum exceeds 60 atomic percent, the effect of adding iron and copper on catalytic activity does not obviously appear, and the catalyst only shows performance equivalent to those of a catalyst composed of platinum alone, or those of a binary alloy catalyst comprising platinum and iron or platinum and copper.

If the proportion of at least one of iron and copper exceeds 40 atomic percent, or the proportion of platinum is less than 40 atomic percent, iron and/or copper is dissolved in the acid electrolyte in an unnegligible proportion, and the alloy phase is degraded to reduce the stability of the catalyst.

The composition range which ensures enhanced catalytic activity and catalyst stability is a range of 40 to 60 atomic percent for platinum, 13 to 40 atomic percent for iron and 13 to 40 atomic percent for copper.

Desirably, the platinum-iron-copper alloy of this invention is supported on the conductive carbon powder carrier in a highly dispersed state with a metal surface area of at least 30 m$^2$/g, preferably at least 60 m$^2$/g. If the surface area is less than 30 m$^2$/g, the catalytic activity per unit weight of the alloy is insufficient, and such a catalyst is not economical.

A conductive carbon powder is preferred as a carrier material for supporting this alloy, and for example, conductive carbon black, acetylene black and graphite powder may be used. Specific examples include oil furnace black sold under the tradenames Vulcan XC-72R and XC—72 (products of Cabot Corporation). Conductex 975 (a product of Columbian Chemicals Co.), and acetylene black sold under the tradename Shawinigan Black (a product of Gulf Oil Corporation). Vulcan XC-72 or Conductex 975 is desirably heat-treated at high temperatures in vacuum or in an inert gas atmosphere to perform partial graphitization treatment and thereby to increase corrosion resistance as a carrier of electrocatalyst used under highly corrosive conditions in which the acid electrolyte at high temperatures and an oxidizer such as oxygen are present.

The carrier material generally has a BET surface area of 60 to 250 m$^2$/g and an average particle diameter of 0.1 to 50 microns.

The loading amount of the platinum alloy on the carrier in the supported platinum alloy catalyst of this invention is usually 0.1 to 30 % by weight, preferably 5 to 15 % by weight, based on the total weight of the carrier and the platinum alloy. If it exceeds 30 % by weight, the degree of dispersion of the alloy on the carrier becomes relatively poor, and for an increase in the amount of the alloy used, the performance of the catalyst is not correspondingly improved, and the economical advantage of using the carrier is reduced. Conversely, if the loading amount of the alloy is extremely lowered, there is an upper limit to the degree of dispersion of alloy. If the degree of dispersion exceeds this limit, its activity per unit mass of the catalyst decreases, and a large amount of the catalyst is undesirably required.

The supported ordered platinum alloy catalyst of this invention can be produced, for example, by the following procedure. First, a powdery carrier material such as conductive carbon black is contacted with an aqueous solution or aqueous suspension (slurry) of compounds of metallic components constituting the alloy to permit adsorption or impregnation of the metallic compounds or their ions on or in the carrier. Then, while the slurry is stirred at a high speed, a dilute solution of a suitable fixing agent such as ammonia, hydrazine, formic acid or formalin is slowly added dropwise to disperse and deposit the metallic components on the carrier as insoluble compounds or partly reduced fine metal particles.

Acids or salts, such as divalent or tetravalent chloroplatinic acid, chloroplatinate salts, or solubilized $H_2Pt(OH)_6$ may be used as the platinum compound. Examples of the iron compound are ferrous chloride, ferric chloride, ferrous nitrate, ferric nitrate, ferous sulfate and ferric sulfate. Examples of the copper compound include cuprous chloride, cupric chloride, cupric nitrate and cupric sulfate.

In loading these metal compounds on the carrier, a method of simultaneous loading of three components using a mixed solution of compounds of platinum, iron and copper may be applied. Alternatively, various multistep loading methods may also be used. For example, first a supported platinum catalyst having only platinum on the carrier is prepared, and then iron and copper are simultaneously loaded, or first iron and then copper are successively loaded.

The one-step alloying treatment by which iron and copper are simultaneously loaded on the supported platinum catalyst is advantageous because the operation is simple. However, to obtain a desirable tegtragonal ordered alloy in accordance with this invention from the resulting catalyst precursor, an alloying treatment at relatively high temperatures becomes necessary. To obtain a highly dispersed tetragonal ordered alloy catalyst, a two-step alloying method is preferred which comprises first loading iron alone on the supported platinum catalyst and reducing and alloying it to form an ordered alloy, then loading copper, heating the mass again at relatively low temperature to reduce and alloy it, or loading only copper on the supported platinum catalyst, reducing and alloying it, then loading iron, and again heating the mass for reduction and alloying.

The slurry of the catalyst precursor having dispersed and deposited platinum, iron and, copper is filtered and then dried in a nitrogen stream. Then, in a hydrogen atmosphere or an atmosphere of a gas containing hydrogen, it is heated for reduction and alloying. Even when it is heated in a hydrogen-free inert gas or in vacuum, some extent of reduction and alloying take place by the reducing function of the carbonaceous material used as the carrier, but the degree of alloying is frequently insufficient, and in most cases, the resulting catalyst does not exhibit sufficient catalytic activity.

Generally, alloying of the loaded components require some degree of high temperature treatment. With the ternary system of platinum, iron and copper within the composition range of the catalyst of this invention, solid solution alloying hardly takes place at temperatures below 600° C. A solid solution alloy is formed at temperatures above 600° C., but the product formed at a relatively low temperature range of 600 to 900° C. is a cubic ordered alloy. In order to obtain a tetragonal ordered alloy of the tulameenite type, high temperatures of 850 to 1,050° C. are necessary, and temperatures of 900 to 1000° C. are preferred. The time during which the catalyst precursor is maintained at the above temperatures is from 20 minutes to 2 hours.

Heat-treatment at excessively high temperatures for a long period of time should be avoided because it results in the growth of the crystallite size of the alloy and decreases the metal surface area of the resulting catalyst.

The optimum temperature and time for the alloying treatment depend upon the particle sizes and the degree of dispersion of the metals or their compounds deposited on the catalyst precursor before reduction and alloying. When the particle diameter is small and the components are highly dispersed sufficient alloying proceeds at lower temperatures within a shorter period of time to give an alloy having a small crystallite diameter in the highly dispersed state.

The preferred alloy crystallite diameter of the ternary ordered alloy in accordance with this invention is not more than 100 Å, especially not more than 50 Å. To obtain such fine crystallite, the slurry concentration, the rate of dropwise addition of the fixing agent and the stirring speed in the loading step and the heat-treatment temperature and time in the reduction and alloying step should be controlled so that the particle diameter of the metals or their compounds loaded on the catalyst precursor is not more than 50 Å, preferably not more than 30 Å.

The temperature, at which a tetragonal ordered alloy having a preferred crystal form in accordance with this invention is formed, depends also upon the chemical existing states of the individual metal components on the catalyst precursor. As stated herein above, a tetragonal ordered alloy can be formed at 850 to 900° C. by subjecting a catalyst precursor containing platinum and iron to reduction and alloying treatment at 800 to 900° C. to form a cubic ordered alloy of platinum and iron, dispersing and depositing copper on it, and again heating the mass for alloying. On the other hand, when iron and copper are loaded simultaneously on a supported platinum catalyst and alloying is carried out in one step, high temperatures of 950 to 1050° C. are required to obtain a tetragonal ordered alloy. According to the two-step alloying method in accordance with this invention, a tetragonal ordered alloy can be formed at lower temperatures. As a result, the crystallite size of the resulting alloy can be made smaller than in the case of one-step alloying, and an alloy catalyst having a larger metal surface area can be formed. The mass activity of the resulting catalyst, obtained as the product of the larger metal surface area multiplied by higher specific activity to be described below, is synergistically large, and its performance is high.

The oxygen reduction specific activity of the platinum-iron-copper ternary ordered alloy catalyst of this invention is higher than any of the multi-component alloy catalysts previously reported, and is at least 3.3 times that of a catalyst of platinum alone supported on the same carrier. A catalyst which contains platinum, iron and copper but does not form a sufficiently ordered alloy shows only lower specific activity. Among the ordered alloys, a tetragonal ordered alloy of the tulameenite type shows higher specific activity and higher catalyst stability than a cubic ordered alloy.

The stability of the electrocatalyst is defined by the rate of retention after the electrode is maintained for a fixed period of time under loading of a fixed potential in an electrolyte, or by the reciprocal of the decay rate of cell terminal voltage after the acid electrolyte fuel cell is operated for a fixed period of time at a fixed current density.

The electrode of this invention for an acid electrolyte fuel cell using such a platinum alloy electrocatalyst will now be described. The fuel cell electrode is obtained by binding the platinum-iron-copper supported ternary ordered alloy catalyst and a water-repellent binder such as polytetrafluoroethylene, polyfluoroethylene-propylene or a trifluoroalkoxypolyethylene to an electrically conductive and acid-resistant supporting member such as graphite paper or a tantalum screen previously subjected to water-repelling treatment, and is especially useful as an oxygen reduction cathode of a phosphoric acid-type fuel cell. The water-repellent binder is required in order to bind the catalyst layer to the conductive supporting member, and also render the catalyst layer sufficiently able to diffuse a reactant gas such as hydrogen or oxygen or a product gas such as water in the electrolyte, and to form a three phase interface of gas, liquid and solid.

The electrode of this invention may be fabricated, for example, by the following procedure. First, the above platinum-iron-copper supported ternary ordered alloy catalyst is produced as above. The resulting catalyst powder is mixed with a polytetrafluoroethylene suspension (commercially available from E I Du Pont de Nemours & Co. under the tradename of TFE-30) or another water-repellent binder composed of an acid-resistant polymer material to form a homogeneous suspension. The homogeneous suspension of the catalyst and the water-repellent binder is spread by a suction filtration method, a spraying method, a roll coating method, etc. on a graphite paper as a supporting member previously subjected to water-repelling treatment with an acid-resistant polymer material. The resulting material is then calcined in an atmosphere of an inert gas.

Desirably, the platinum alloy is present on the supporting member in a catalytically effective amount. The catalytically effective amount generally corresponds to about 0.1 to 2 mg, preferably about 0.2 to 1 mg, more preferably about 0.3 to 0.7 mg, of the platinum-iron-copper alloy per cm$^2$ of the geometrical surface area of the electrode supporting member.

The above electrode of the invention can be utilized as a general gas diffusing electrode such as a button battery cell electrode, a gas sensor electrode and an electrolytic cell electrode, but especially preferably as an electrode for an acid electrolyte fuel cell. Examples of the electrolyte used in such a fuel cell include sulfuric acid, hydrochloric acid, and various superacids such as trifluoromethanesulfonic acid, difluoromethanedisulfonic acid, and polytrifluoroethylenesulfonic acid in addition to phosphoric acid.

The following examples illustrate the present invention more specifically. It should be understood however that the present invention is not to be limited to these examples.

PRODUCTION EXAMPLE 1

Supported Pt catalyst

Eighty-one grams of heat-treated conductive carbon black (Vulcan XC-72R, a product of Cabot Corporation) having a specific surface area of 110 m$^2$/g was slurried in 1500 ml of deionized water containing 4.0 g of glacial acetic acid. Separately, 9.0 grams of Pt as H$_2$Pt(OH)$_6$ was dissolved with amine in 600 ml of an aqueous solution. The platinum solution was added to the carbon slurry with stirring. While gradually adding 50 g of a 5 % aqueous solution of formic acid as a reducing agent, the temperature of the slurry was elevated gradually to about 95° C., and then maintained at 95° C. for 30 minutes. It was allowed to cool to room temperature, filtered, and washed with deionizaed water. The filtration cake was dried at 95° C. for 16 hours in a stream of nitrogen. The resulting,10 wt % Pt/C catalyst (C-1*) (* means a comparative example; the same hereinafter) has an MSA of 120 m$^2$/g.

PRODUCTION EXAMPLE 2

Supported Pt-Fe-Cu (atomic ratio 50:25:25) cubic ordered alloy catalyst:)

Fifty grams of the Pt/C catalyst (C-1*) produced in Production Example 1 was dispersed in 1000 ml of deionized water by an ultrasonic blender to form a homogeneous slurry. While the slurry was stirred sufficiently vigorously, 150 ml of a mixed aqueous solution containing 0.72 g of Fe as iron (III) nitrate and 0.82 g of Cu as copper (II) nitrate was added to the slurry. Then, the pH of the slurry was adjusted to 8.0 while a 5 % dilute aqueous solution of hydrazine was slowly added dropwise over 1 hour. The mixture was further maintained for one hour with stirring. The slurry was then filtered, and washed with deionized water. The filtration cake was dried at 95° C. in a stream of nitrogen The product was heated at 900° C. for 1.2 hours in a stream of 7 % by volume of hydrogen (the remainder being nitrogen), and allowed to cool to room temperature to give a carbon supported Pt-Fe-Cu alloy catalyst (C-2). In the Powder X-ray diffractometry (Cu K$\alpha$ ray), unlike the XRD pattern of a platinum catalyst (C-1*), ordered peaks (100) $2\theta=23.2°$ (appearing as a shoulder of a diffraction peak of graphite (002) of the carbon black carrier) and (110) $2\theta=32.7°$ appeared in the lower diffraction angle side than the main diffraction peak (111)$2\theta=40.7°$, and only one epeak appeared near $2\theta=69.3°$ in the (220) diffraction region. The catalyst was therefore identified as $L_{12}$ type ordered cubic alloy. It had a lattice constant a$=9.934$ Å and a crystallite size of 38 Å.

Observation under an analytical transmission electron microscope consisting of a transmission electron microscope and an energy-dispersive X-ray microanalyazer showed that the composition of the alloy particles was Pt:Fe:Cu atomic ratio$=50:25:25$. This led to the determination that the alloy was a $Pt_2FeCu$ solid solution alloy.

PRODUCTION EXAMPLE 3

Supported Pt-Fe-Cu (atomic ratio 50:25:25) catalyst:

A carbon supported Pt-Fe-Cu (atomic ratio 50:25:25) catalyst (C-3*) was produced as in Production Example 2 except that the dried cake was heated at 500° C. for 2 hours in a stream of nitrogen. XRD peaks appeared at (111)$2\theta=40.1°$ and (220) $2\theta=68.0°$. It was determined that although alloying occurred partly, the product on the whole remained non-alloyed, namely in the state of a mixture of Pt, Fe and Cu.

PRODUCTION EXAMPLE 4

Supported Pt-Fe-Cu cubic ordered alloy catalyst:

Carbon supported Pt-Fe-Cu alloy catalysts having a Pt:Fe:Cu atomic ratio of (40:20:40), (55:28:17), and (60:20:20) respectively (C-4, C-5, and C-6, respectively) were produced in the same way as in Production Example 2 except that the amounts of iron (III) nitrate and copper (II) nitrate charged were varied. By XRD, it was determined that these supported alloys were all cubic ordered alloys. The lattice parameters and crystallite sizes of these catalysts are shown in Table 1.

PRODUCTION EXAMPLE 5

Supported Pt-Fe-Cu (atomic ratio 50:25:25) tetragonal ordered alloy catalyst:

A carbon supported Pt-Fe-Cu (atomic ratio 25:25) alloy catalyst (C-7) was produced in the same way as in Production Example 2 except that the dried cake was maintained at 1000° C. for 1.2 hours in a stream of 7 % by volume of hydrogen (the remainder being nitrogen).

The XRD pattern of this catalyst had ordered peaks at (100) $2\theta=22.8°$ and (110) $2\theta=32.2°$, and two diffraction peaks in the (220) region, i.e. (220) $2\theta=67.8°$ and (202) $2\theta=70.8°$. This led to the determination that the catalyst had $L_{10}$-type tetragonal ordered alloy. The lattice parameters were a$=3.906$, c$=3.631$, c/a$=0.9296$, and the crystallite size was 60 Å.

PRODUCTION EXAMPLE 6

Supported Pt-Fe-Cu tetragonal ordered alloy catalysts:

Carbon supported Pt-Fe-Cu alloy catalysts (C-8, C-9 and C-10 having a Pt:Fe:Cu atomic ratio of (40:20:40), (50:17:22) and (60:20:20), respectively were produced in the same way as in Production Example 5 except that the amounts of iron (III) nitrate and copper (II) nitrate charged were varied. XRD led to the determination that the supported alloys of these catalysts were all tetragonal ordered alloys. The lattice parameters and crystallite sizes of these catalyts are summarized in Table 1.

PRODUCTION EXAMPLE 7

Supported Pt-Fe-Cu cubic ordered alloy catalysts

Carbon supported Pt-Fe-Cu alloy catalysts (C-11*, C-12*, C-13* and C-14*) having a Pt:Fe:Cu atomic ratio of (34:33:33), (45:45:10), (62:31:7), and (82:9:9), respectively, were produced in the same way as in Production Example 2 except that the amounts of iron (III) nitrate and copper (II) nitrate charged were varied. XRD led to the determination that the supported alloys of the catalysts are all cubic ordered alloys. The lattice parameters and crystallite sizes of these catalysts are summarized in Table 1.

PRODUCTION EXAMPLE 8

Supported Pt-Fe-Cu tetragonal ordered alloy catalysts:

Carbon supported Pt-Fe-Cu alloy catalysts (C-15*, C-16*, C-17* and C-18*) having a Pt:Fe:Cu atomic ratio of (34:33:33), (45:45:10), (62:31:7) and (82:9:9) respectively were produced in the same way as in Production Example 5 except that the amounts of iron (III) nitrate and copper (II) nitrate charged were varied. The lattice parameters and crystallite sizes of these catalysts are summarized in Table 1.

PRODUCTION EXAMPLE 9

Supported Pt-Fe (atomic ratio 67:33) cubic ordered alloy catalyst:

A carbon supported Pt-Fe (atomic ratio 67:33) alloy catalyst (C-19*) was produced in the same way as in Production Example 2 except alone was deposited on the carbon supported Pt catalyst (C-1*) by using an aqueous solution of iron (III) nitrate containing 0.72 g of Fe. By XRD, it was determined that a cubic ordered alloy having a lattice parameter a of 3.862 Å and a crystallite size of 34 Å was formed.

PRODUCTION EXAMPLE 10

Supported Pt-Fe cubic ordered alloy catalyst:

Carbon supported Pt-Fe alloy catalysts (C-20* and C-21*) having a Pt:Fe atomic ratio of (50:50) and (75:25), respectively, were produced in the same way as in Production Example 9 except that the amount of iron (III) nitrate charged was varied. XRD led to the determination that these supported alloys are cubic ordered alloys. The lattice parameters and crystallite sizes of these catalysts are summarized in Table 2.

PRODUCTION EXAMPLE 11

Supported Pt-Fe-Cu (atomic ratio 50:25:25) tetragonal ordered alloy catalyst:

Fifty grams of the carbon supported Pt-Fe alloy catalyst (C-19*) obtained in Production Example 9 was dispersed by an ultrasonic blender in 1000 ml of deionized water to form a homogeneous slurry. While the slurry was stirred sufficiently vigorously, 75 ml of an aqueous solution containing 0.82 g of Cu as copper (II) nitrate was added to the slurry. Then, while a 5 % dilute aqueous solution of hydrazine was slowly added dropwise over 1 hour, the pH of the slurry was adjusted to 8.0. After filtration, washing and drying, the product was subjected to an alloying treatment to produce a carbon supported Pt-Fe-Cu alloy catalyst (C-22). XRD led to the determination of the formation of a tetragonal ordered alloy having lattice parameters $a=3.887$ Å, $c=3.639$ Å and $c/a=0.9362$ and a crystallite size of 40 Å.

In the same way, Cu was deposited on the carbon supported Pt-Fe alloy catalysts (C-20*) and (C-21*) in an amount of 0.35 g and 0.54 g, respectively. The resulting catalyst precursors were subjected to an alloying treatment in accordance with Production Example 2 to produce carbon supported Pt-Fe-Cu tetragonal ordered alloy catalysts (C-23* and C-24) having a Pt:Fe:Cu atomic ratio of (45:45:10) and (60:20:20) respectively. The lattice parameters and crystallite sizes of these catalysts are shown in Table 1.

PRODUCTION EXAMPLE 12

Supported Pt-Fe (atomic ratio 50:50) tetragonal ordered alloy catalyst:

A carbon supported Pt-Fe (atomic ratio 50:50) catalyst (C 25*) was produced in the same way as in Production Example 5 except that only Fe was deposited on the carbon supported Pt catalyst (C-1*) by using an aqueous solution containing 0.72 g of Fe as iron (III) nitrate. XRD led to the determination of the formation of a tetragonal ordered alloy having lattice parameters, $a=3.863$ Å, $c=3.722$ Å, $c/a=0.9635$..

PRODUCTION EXAMPLE 13

Supported Pt-Cu disordered alloy catalyst:

A supported Pt-Cu (atomic ratio 67:33) alloy catalyst (C-26*) was produced in the same way as in Production Example 2 except that Cu alone was deposited on the carbon supported Pt catalyst (C-1*) by using an aqueous solution containing 0.82 g of copper as copper (II) nitrate. XRD led to the determination of the formation of an f.c.c. solid solution alloy having a lattice parameter a of 3.836 Å and crystallite size of 35 Å. No ordered peak was detected.

In the same way as above, a supported Pt-Cu (atomic ratio 50:50) alloy catalyst (C-27*) was produced by depositing 1.63 g of Cu on the carbon supported Pt catalyst (C-1*) and alloying the resulting product in accordance with Production Example 2. When the same catalyst precursor was alloyed in accordance with Production Example 5. It was determined by XRD that the resulting supported Pt-Cu alloy catalyst only provided a growth of its crystallize size to 89 Å, and its space symmetry was not changed from that of a disordered alloy.

PRODUCTION EXAMPLE 14

Supported Pt-Fe-Cu (atomic ratio 50:25:25) tetragonal ordered alloy catalyst:

A carbon supported Pt-Fe-Cu alloy catalyst (C-28) was in the same way as in Example 2 except that FE alone was deposited on the carbon supported Pt-Cu alloy catalyst (C-26*) produced in Production Example 13 by using an aqueous solution containing 0.72 g of Fe as iron (III) nitrate. XRD led to the determination of the formation of a tetragonal ordered alloy having lattice parameters $a=3.889$ Å, $c=3.637$ Å and $c/a=0.9352$ and a crystallite size of 39 Å.

PRODUCTION EXAMPLE 15

Supported Pt-Fe-Co (atomic ratio 50:25:25) cubic ordered alloy catalyst:

A supported Pt-Fe-Co alloy catalyst (C-29*) was produced in the same way as in Production Example 2 except that Fe and Co were deposited on the carbon supported Pt catalyst (C-1*) by using a mixed aqueous solution containing 0.72 g of Fe as iron (III) nitrate and 0.76 g of Co as cobalt (II) nitrate. XRD led to the determination of the formation of an cubic ordered alloy having a lattice parameter, a of 3.817 Å and a crystallite size of 35 Å.

PRODUCTION EXAMPLE 16

Supported Pt-Cr-Co (atomic ratio 50:25:25) ordered alloy catalyst:

A supported Pt-Cr-Co alloy catalyst (C-30*) was produced in the same way as in Production Example 2 except that Cr and Co were deposited on the Pt catalyst (C-1*) by using a mixed aqueous solution containing 0.67 g of Cr as chromium (III) nitrate and 0.76 g of Co as cobalt (II) nitrate. XRD led to the determination of the formation of a cubic ordered alloy having a lattice parameter a of 3.827 Å and a crystal dsize of 36 Å.

PRODUCTION EXAMPLE 17

Supported Pt-Co-Ni (atomic ratio 50:25:25) disordered alloy catalyst:

A supported Pt-Co-Ni alloy catalyst (C-31*) was produced in the same way as in Production Example 2 except that Co and Ni were deposited on the Pt catalyst (C-1*) by using a mixed aqueous solution containing 0.76 g of Co as cobalt (II) nitrate and 0.75 g of nickel (II) nitrate. XRD led to the Determination of the formation of an f.c.c. disordered having a lattice parameter a of 3.789 Å and a crystallite size of 32 Å.

TABLE 1

| Production Example | Catalyst (atomic ratio) | Catalyst No. | Solid solution alloy | | XRD lattice parameters | | | Crystallite size (Å) |
|---|---|---|---|---|---|---|---|---|
| | | | Crystal form | Super lattice structure | a (Å) | c (Å) | c/a | |
| 2 | Pt—Fe—Cu(50:25:25)/C | C-2 | cubic | ordered | 3.834 | — | — | 38 |
| 4 | Pt—Fe—Cu(40:20:40)/C | C-4 | cubic | ordered | 3.798 | | | 32 |

TABLE 1-continued

| Production Example | Catalyst (atomic ratio) | Catalyst No. | Solid solution alloy Crystal form | Super lattice structure | XRD a (Å) | lattice c (Å) | parameters c/a | Crystallite size (Å) |
|---|---|---|---|---|---|---|---|---|
| " | Pt—Fe—Cu(55:28:17)/C | C-5 | cubic | ordered | 3.856 | | | 40 |
| " | Pt—Fe—Cu(60:20:20)/C | C-6 | cubic | ordered | 3.862 | | | 38 |
| 5 | Pt—Fe—Cu(50:25:25)/C | C-7 | tetragonal | ordered | 3.906 | 3.631 | 0.9296 | 60 |
| 6 | Pt—Fe—Cu(40:20:40)/C | C-8 | tetragonal | ordered | 3.896 | 3.606 | 0.9256 | 55 |
| " | Pt—Fe—Cu(50:17:33)/C | C-9 | tetragonal | ordered | 3.903 | 3.628 | 0.9295 | 58 |
| " | Pt—Fe—Cu(60:20:20)/C | C-10 | tetragonal | ordered | 3.909 | 3.636 | 0.9302 | 65 |
| 11 | Pt—Fe—Cu(50:25:25)/C | C-22 | tetragonal | ordered | 3.887 | 3.639 | 0.9362 | 40 |
| " | Pt—Fe—Cu(60:20:20)/C | C-24 | tetragonal | ordered | 3.878 | 3.665 | 0.9451 | 44 |
| 14 | Pt—Fe—Cu(50:25:25)/C | C-28 | tetragonal | ordered | 3.889 | 3.637 | 0.9352 | 39 |
| 3 | Pt—Fe—Cu(50:25:25)/C | C-3* | f.c.c. | disordered | 3.894 | | | 28 |
| 7 | Pt—Fe—Cu(34:33:33)/C | C-11* | cubic | ordered | 3.797 | | | 36 |
| " | Pt—Fe—Cu(45:45:10)/C | C-12* | cubic | ordered | 3.862 | | | 40 |
| " | Pt—Fe—Cu(62:31:7)/C | C-13* | cubic | ordered | 3.877 | | | 47 |
| " | Pt—Fe—Cu(82:9:9)/C | C-14* | cubic | ordered | 3.898 | | | 60 |
| 8 | Pt—Fe—Cu(34:33:33)/C | C-15* | tetragonal | ordered | 3.863 | 3.667 | 0.9493 | 50 |
| " | Pt—Fe—Cu(45:45:10)/C | C-16* | tetragonal | ordered | 3.875 | 3.705 | 0.9589 | 62 |
| " | Pt—Fe—Cu(62:31:7)/C | C-17* | cubic | ordered | 3.856 | | | 76 |
| " | Pt—Fe—Cu(82:9:9)/C | C-18* | cubic | ordered | 3.890 | | | 90 |
| 11 | Pt—Fe—Cu(45:45:10)/C | C-23* | tetragonal | ordered | 3.871 | 3.723 | 0.9618 | 42 |

TABLE 2

| Production Example | Catalyst (atomic ratio) | Catalyst No. | Solid solution alloy Crystal form | Super lattice structure | a (Å) | c (Å) | c/a | (Å) |
|---|---|---|---|---|---|---|---|---|
| 1 | Pt/C | C-1* | f.c.c. | — | 3.923 | — | — | 23 |
| 9 | Pt—Fe(67:33)/C | C-19* | cubic | ordered | 3.862 | — | — | 34 |
| 10 | Pt—Fe(50:50)/C | C-20* | cubic | ordered | 3.847 | — | — | 39 |
| " | Pt—Fe(75:25)/C | C-21* | cubic | ordered | 3.881 | | | 41 |
| 12 | Pt—Fe(50:50)/C | C-25* | tetragonal | ordered | 3.863 | 3.722 | 0.9635 | 61 |
| 13 | Pt—Cu(67:33)/C | C-26* | f.c.c. | disordered | 3.836 | — | — | 35 |
| " | Pt—Cu(50:50)/C | C-27* | f.c.c. | disordered | 3.794 | — | — | 37 |
| 15 | Pt—Fe—Co(50:25:25)/C | C-29* | cubic | ordered | 3.817 | — | — | 35 |
| 16 | Pt—Cr—Co(50:25:25)/C | C-30* | cubic | ordered | 3.827 | — | — | 36 |
| 17 | Pt—Co—Ni(50:25:25)/C | C-31* | f.c.c. | disordered | 3.789 | — | — | 32 |

Production of electrodes

Each of the catalysts obtained in Production Examples 1 to 16, C-1*, C-2, C-3*, C-4 to C-10, C-11* to C-20*, C-22, C-23*, C-24, C-25* to C-27*, C-28, and C-29* to C-31*, was dispersed by an ultrasonic blender in an aqueous dispersion of polytetrafluoroethylne (TEFLON ®, TFE-30, a product of E. I. Du Pont de Neamous and Co.). Aluminum trichloride was added to the mixed slurry to flocculate and precipitate a cotton-like floc. The cotton-like floc containing the catalyst and polytetra-fluoroethylene in a dry weight ratio of 50:50 was spread on a supporting member composed of graphite paper previously subjected to a water-repelling treatment with polytetrafluoroethylene. The resulting material was pressed, dried, and calcined in a nitrogen stream at 350° C. for 15 minutes to provide electrodes E-1*, E-2, E-3*, E-4 to E-10, E-11* to E-20*, E-22, E-23*, E-24, E-25* to E-27*, E-28, E-29* to E-31*, E-28, E-29* to E-31* cor-responding to the catalysts C-1*, C-2, C-3*, C-4 to C-10, C-11* to C-20*, C-22, C-23*, C-24, C-25* to C-27*, C-28, and C-29* to C-31* respectively. These electrodes were produced so that they contained 0.50 mg of the deposited metals (i.e., Pt or Pt alloys) per $cm^2$ of the electrode.

The catalysts and electrodes obtained in the foregoing illustrative and corporative examples were subjected to the following tests.

I. Test for specific activity to an oxygen reduction reaction

Oxygen half cell performance was measured on each of electrodes E-1*, E-2, E-3*, E-4 to E-10, E-11* to E-20*, E-22, E-23*, E-24, E-25* to E-27*, E-28, E-29* to E-31*, by passing an oxygen ($O_2$) gas at a flow rate of 600 ml/min. over an electrode (24 mm in diameter) using 105% phosphoric acid as an electrolyte at 200° C. A half cell performance curve of internal resistance-free (IR-free) terminal voltage vs. current densities was obtained. The current density (mA/$cm^2$) of each of these electrodes at +900 mV vs. RHE was determined. The current density was divided by the loaded amount of Pt per unit electrode surface, and further by the EC.MSA ($m^2$/g Pt) to obtain specific activity ($\mu$A/$cm^2$Pt). The results are shown in Tables 3 and 4. The carbon supported Pt-Fe-Cu ordered alloy (E-2, E-4 to E-10, E-22, E-24 and E-28) of the invention showed high activity 3.3 to 4 times that of Pt alone (E-1*)and had higher activity than any of ordered or disordered alloys Pt-Fe (E-19*, E-20 *), Pt-Cu (E-26*, E-27*), Pt-Fe-Co (E-29 *), Pt-Cr-Co (E-30*) and Pt-Co-Ni (E-31*) heretofore known. Among Pt-Fe-Cu ordered alloys, the tetragonal ordered alloys (E-7 to E-10, E-22, E 24, E-28) had 3% to 20 % higher activity than cubic ordered alloys (E-2, E-4 to E-6) of the same composition.

Among the Pt-Fe-Cu tetragonal ordered alloy catalysts, those prepared by the low-temperature two-step alloying method and those obtained by high temperature one-step alloying method had nearly the same specific activity, but the former catalysts (E-22, E-24 and E-28) had larger EC.MSA values than the latter catalysts (E-7 to E-10), and thus were 20 to 50 % higher in mass activity than the latter.

Pt-Fe-Cu ordered alloys containing less than 40 atomic percent of Pt (E-11* and E-15*) or those having more than 60 atomic percent of Pt (E-13*, E-14*, E-17* and E-18*), or those containing less than 13 atomic percent, or more than 40 atomic percent, of Fe or Cu stream and applying a constant voltage of +700 mV (vs. RHE), the sample was maintained at 200° C. for 50 hours. Then, its EC.MSA was measured, and compared with those of the sample before the treatment. The results are shown in Tables 3 and 4.

TABLE 3

| Electrode No. | Catalyst | Oxygen reduction specific activity (μA/cm²)Pt | Before testing | EC₂MSA (m²/g Pt) 200° C., +0.7 V 50 hours later | Retention (%) |
|---|---|---|---|---|---|
| E-2 | Pt—Fe—Cu/C | 118 | 77 | 57 | 74 |
| E-4 | Pt—Fe—Cu/C | 115 | 88 | 63 | 72 |
| E-5 | Pt—Fe—Cu/C | 117 | 75 | 57 | 76 |
| E-6 | Pt—Fe—Cu/C | 110 | 80 | 60 | 75 |
| E-7 | Pt—Fe—Cu/C | 128 | 54 | 42 | 78 |
| E-8 | Pt—Fe—Cu/C | 122 | 60 | 46 | 77 |
| E-9 | Pt—Fe—Cu/C | 126 | 55 | 42 | 76 |
| E-10 | Pt—Fe—Cu/C | 128 | 48 | 38 | 79 |
| E-22 | Pt—Fe—Cu/C | 132 | 75 | 60 | 80 |
| E-24 | Pt—Fe—Cu/C | 128 | 71 | 55 | 77 |
| E-28 | Pt—Fe—Cu/C | 130 | 77 | 59 | 77 |
| E-3* | Pt—Fe—Cu/C | 59 | 100 | 56 | 56 |
| E-11* | Pt—Fe—Cu/C | 82 | 92 | 51 | 55 |
| E-12* | Pt—Fe—Cu/C | 77 | 78 | 53 | 68 |
| E-13* | Pt—Fe—Cu/C | 69 | 75 | 47 | 63 |
| E-14* | Pt—Fe—Cu/C | 50 | 52 | 35 | 67 |
| E-15* | Pt—Fe—Cu/C | 88 | 57 | 35 | 61 |
| E-16* | Pt—Fe—Cu/C | 84 | 53 | 37 | 70 |
| E-17* | Pt—Fe—Cu/C | 65 | 46 | 31 | 67 |
| E-18* | Pt—Fe—Cu/C | 56 | 39 | 32 | 82 |
| E-23* | Pt—Fe—Cu/C | 85 | 80 | 52 | 65 |

TABLE 4

| Electrode No. | Catalyst | Oxygen reduction specific activity (μA/cm²)Pt | Before testing | EC₂MSA (m²/g Pt) 200° C., +0.7 V 50 hours later | Retention (%) |
|---|---|---|---|---|---|
| E-1* | Pt/C | 33 | 120 | 48 | 40 |
| E-19* | Pt—Fe/C | 79 | 81 | 50 | 62 |
| E-20* | Pt—Fe/C | 72 | 73 | 53 | 73 |
| E-25* | Pt—Fe/C | 80 | 67 | 49 | 73 |
| E-26* | Pt—Cu/C | 108 | 82 | 64 | 78 |
| E-27* | Pt—Cu/C | 102 | 80 | 58 | 73 |
| E-29* | Pt—Cu/C | 102 | 82 | 58 | 71 |
| E-30* | Pt—Cr—Co/C | 83 | 77 | 51 | 66 |
| E-31* | Pt—Co—Ni/C | 90 | 88 | 56 | 64 |

(E-12*, E-16* and E-23*) had specific activity equivalent to conventional binary to ternary alloys at the highest.

Tetragonal ordered alloys falling outside the preferred composition range of this invention (40 to 60 atomic percent of Pt; 13 to 40 atomic percent of Fe; and 13 to 40 atomic percent of Cu), namely E-15 *, E-16*, E-23* and E-25* had higher specific activity than cubic alloys of the corresponding composition (E-11*, E-12* and E-20*, respectively), but their specific activity was still the same as that of conventional catalyst. Even the highly dispersed alloy (E-23*) prepared by the two-step alloying method is no exception, and its mass activity was not so high and only 1.7 times that of Pt alone. A Pt-Fe-Cu ternary alloy catalyst within the composition range of this invention in which, however, alloying is insufficient, (E-3*), had a specific activity only equalling to that of a conventional binary or ternary alloy catalyst at the highest.

II. Test for electrode stability

A test sample of each of electrodes E-1*, E-2, E-3*, E-4 to E-10, E-11* to E-20*, E-22, E-23*, E-24, E-25* to E-27*, E-28, and E-29* to E-31* was immersed in 100 ml of 105% phosphoric acid put in an aging cell. While the atmosphere was purged with a dry nitrogen gas The electrodes E-2 to E-10, E-22, E-24 and E-28 having the Pt-Fe-Cu ordered alloy catalysts of this invention showed 1.8 times as high a stability as electrode E-1* containing Pt alone as a catalyst. Among conventional binary or ternary alloy catalysts, only Pt-Cu/C (E-25* and E-26*) were comparable with the above catalysts. The other Pt-Fe/C (E-19* and E-20 *), Pt-Fe/Co/C (E-29*), Pt-Cr-Co/C (E-30*), and Pt-Co-Ni/C (E-31*) all had an EC.MS retention of not more than 73 %. Pt-Fe/C (E-25*) contained an ordered tetragonal alloy not at all mentioned in the above-cited Japanese Laid-Open Patent Publication No. 156551/1985 and had an alloy crystal structure similar to the Pt-Fe-Cu tetragonal ordered alloy of this invention. This is probably the reason why E-25* had high stability. Stability alone, however, is not enough for a catalyst of high performance, and it must have both high specific activity and high stability. The specific activity of a Pt-Fe tetragonal alloy (E-25*) does not exceed 70 % of that of the Pt-Fe-Cu ordered alloy of this invention. Furthermore, as stated above, the specific activities of the Pt-Cu alloys (E-25* and E-26*)are below that of the Pt-Fe-Cu ordered alloy of the invention. Pt-Fe-Cu ordered alloy catalysts outside the composition range of 40 to 60 atomic percent Pt, 13 to 40 atomic percent Fe and 13 to 40 atomic percent Cu had a relatively low EC.MSA retention of less than 70 %, (E-11* to E-15*, E-17* and E-23*), or alter-natively, the initial EC.MSA itself of the above catalyst was very low (E-16* to E-18*).

III. Test of Fuel cell (single cell)

A small-sized single cell (effective electrode area 7.4 cm x 7.4 cm) was assembled by using electrode E-1* as an anode, and each of electrodes E-1*, E-19*, E 22, E-26*, E-29*, E-30*, and E-31* as a cathode. While feeding hydrogen and air to the anode and cathode respectively at a flow rage of 100 ml/min. and 600 ml/min., the cell was operated at a current density of 160 mA/cm$^2$ for 3,000 hours by using 85 % phosphoric acid as an electrolyte. FIG. 3 shows changes with time in the IR-free cell terminal voltage of each single cell.

The single cell using electrode E-22 prepared by using the Pt-Fe-Cu ordered alloy catalyst of this invention as the cathode, in its initial performance 500 hours after the start of operation, showed a cell terminal voltage higher by 55 mV, 27 mV, 13 mV, 5 mV, 22 mV and 20 mV than the single cells using the comparative Pt/C electrode (E-1*), Pt-Fe/C electrode (E-19*), Pt-Cu/C electrode (E-26*), Pt-Fe-Co/C electrode (E-29*), Pt-Cr-CO/C electrode (E-30*) and Pt-Co-Ni/C electrode (E-31*), respectively.

In addition to the higher initial cell voltage, the single cell using E-22 as the cathode showed a markedly suppressed decay rate of cell voltage of about 4 mV/1000 hours, as compared with the decay rates of about 15 mV/1000 hours of the single cell including E-1* as the cathode and 10 mV/1000 hours of the single cells including E-19*, E-29*, E-30* and E-31* as the cathode respectively. The decay rate of the single cell including E-22 as the cathode was about 20 % lower than the decay rate (5 mV/1000 hours) of the single cell including E-26* as the cathode.

As shown above, the carbon powder-supported Pt-Fe-Cu ordered alloy electrocatalyst of this invention shows a much higher performance than conventional multicomponent alloy catalysts both in respect of initial activity and active lifetime as a cathode catalyst for a fuel cell. An acid electrolyte fuel cell constructed by using this elecrocatalyst and a suitable supporting member has an excellent output performance and a long operation life, and brings about a great economical effect.

We claim:

1. A process for producing a supported platinum alloy electrocatalyst for an acid electrolyte fuel cell, which electrocatalyst consists essentially of an electrically conductive powdery carbon carrier and dispersed in, and deposited on, the carrier, an ordered platinum-iron-copper ternary alloy comprising 40 to 60 atomic percent of platinum, 13 to 40 atomic percent of iron and 13 to 40 atomic percent of copper, said process comprising a two-step alloying treatment by firstly depositing one of the base metal components, iron or copper, on platinum which is provided on a carbon precursor support, and subjecting the product to a first step alloying treatment to produce a platinum-iron or platinum-copper supported binary alloy, and next depositing the other base metal component on the supported alloy and subjecting the product to a second step alloying treatment.

2. A process set forth in claim 1, which comprises a two-step method of producing an alloy of platinum, iron and copper, where both alloying treatments are conducted at a temperature of 600 to 1050° C.

3. A process set forth in claim 1, which comprises a two-step method of producing an alloy of platinum, iron and copper, where both alloying treatments are conducted at a temperature of 850 to 1050° C., and wherein said ordered platinum-iron-copper ternary alloy is an ordered platinum-iron-copper face-centered tetragonal ternary alloy.

* * * * *